United States Patent [19]

Corley

[11] Patent Number: 5,169,910

[45] Date of Patent: Dec. 8, 1992

[54] EPOXY RESIN COMPOSITION

[75] Inventor: Larry S. Corley, Houston, Tex.

[73] Assignee: Shell Oil Company, Houston, Tex.

[21] Appl. No.: 564,213

[22] Filed: Aug. 8, 1990

[51] Int. Cl.$^5$ .................... C08L 61/10; C08L 63/10
[52] U.S. Cl. .................................. 525/481; 525/486; 525/488; 525/528; 525/529; 525/532
[58] Field of Search .............. 525/528, 529, 532, 481, 525/486, 488

[56] References Cited

U.S. PATENT DOCUMENTS

| | | | |
|---|---|---|---|
| 3,478,126 | 11/1969 | Turpin et al. | 525/528 |
| 4,284,753 | 8/1981 | Hewitt | 528/89 |
| 4,379,908 | 4/1983 | Brownscombe | 528/91 |
| 4,410,680 | 10/1983 | Brownscombe et al. | 528/88 |
| 4,503,200 | 3/1985 | Corley | 525/532 |
| 4,579,931 | 4/1986 | Corley | 528/90 |
| 4,591,623 | 5/1986 | Nakajima et al. | 525/524 |
| 4,608,313 | 8/1986 | Hickner et al. | 428/414 |
| 4,789,712 | 12/1988 | Hoffman et al. | 525/528 |
| 4,791,154 | 12/1988 | Corley et al. | 523/456 |

FOREIGN PATENT DOCUMENTS 3008305 10/1980 Fed. Rep. of Germany .
2010776 2/1976 France .

OTHER PUBLICATIONS

Lee, H and Neville, K., 'Handbook of Epoxy Resins', McGraw-Hill Book Company, 1967, pp. 6–48, 8–10, 11–13.

Primary Examiner—John C. Bleutge
Assistant Examiner—Helen F. Lee

[57] ABSTRACT

A composition comprising a curable epoxy resin, a reactive diluent, a curing agent for the epoxy resin, and an isocyanate compound is stable at room temperature for extended periods of time and cures to form a part which has good high-temperature properties.

7 Claims, No Drawings

EPOXY RESIN COMPOSITION

BACKGROUND OF THE INVENTION

This invention relates to epoxy resin compositions. In a specific embodiment, the invention relates to latent-curing epoxy resin compositions which can be premixed and stored but cure rapidly under subsequently-imposed curing conditions.

Polyester resins are often fabricated into molded parts using a sheet molding compound (SMC) technique. In this process, a styrene solution of carboxyl-terminated polyester is mixed with a peroxide (or other initiator), a thickening agent such as magnesium oxide, and a filler such as calcium carbonate or clay. This liquid mixture is then mixed with chopped fiberglass between two sheets of polyethylene film, and air bubbles are removed by squeeze rolls. Over 1-2 days, the viscosity increases from an initial value near 1 Pa.s to several thousand Pa.s. The increase in viscosity is caused by reaction of the carboxyl end groups of the polyester with magnesium oxide to form polymeric magnesium carboxylates. The viscosity reaches a plateau after the magnesium oxide is consumed. The SMC then has a leathery consistency, suitable for draping into a mold. The viscosity remains relatively constant for three months or longer, which constitutes the "molding window" of the SMC. If the viscosity is too low, liquid resin will squirt out of the mold during molding. If the viscosity becomes too high, the SMC will be "boardy" and difficult to drape, and it may not have sufficient flow to fill the mold completely.

Almost all commercially-available polyester resins have values of heat distortion temperature (HDT) below 120° C., while much higher HDT's can be obtained with epoxy resins. An epoxy resin processable as SMC by polyester-type techniques would therefore be highly desirable. To prepare such a material would be difficult, however, because of the different cure behavior of polyesters and epoxies. Polyester resins cure by a radical mechanism based on dissociation of an initiator to give radicals which initiate copolymerization of the styrene diluent with the maleate and fumarate groups of the polyester chain. The decomposition rate of most radical initiators is very sharply dependent on temperature. Epoxy resins cure with almost all curing agents by ionic processes which are much less temperature dependent. Hence it is much more difficult with epoxies than with polyesters to obtain a stable mixture at room temperature which cures rapidly at high temperatures.

Styrene-diluted epoxy systems cured with trimellitic anhydride (TMA) have been used to produce epoxy-based SMC for certain high-temperature applications. However, the viscosity of such systems continues to increase after reaching the desired level instead of forming a plateau. The molding window of this SMC is only about 2 days unless it is refrigerated, making it impossible to ship the SMC. Other epoxy curing agents such as aromatic amines give similarly short molding windows.

It is therefore an object of the invention to provide a latent-curing epoxy resin system suitable for use in sheet-molding applications.

BRIEF SUMMARY OF THE INVENTION

According to the invention, a composition is provided comprising a curable epoxy resin, a reactive diluent, a phenolic curing agent for the epoxy resin, and an isocyanate. The composition is stable at room temperature for extended periods, and cures to form a part which has good high-temperature properties.

DETAILED DESCRIPTION OF THE INVENTION

The invention composition includes an epoxy resin. The epoxy resin component of the composition can be any curable resin having, on the average, more than one vicinal epoxide group per molecule. The epoxy resin can be saturated or unsaturated, aliphatic, cycloaliphatic, aromatic or heterocyclic, and may bear substituents which do not materially interfere with the curing reaction.

Suitable epoxy resins include glycidyl ethers prepared by the reaction of epichlorohydrin with a compound containing at least one hydroxyl group carried out under alkaline reaction conditions. The epoxy resin products obtained when the hydroxyl group-containing compound is bisphenol-A are represented below by structure I wherein n is zero or a number greater than 0, commonly in the range of 0 to 10, preferably in the range of 0 to 2.

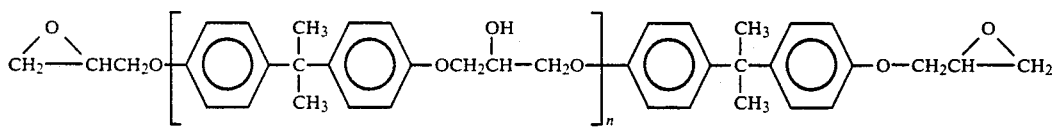

I

Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

Epoxy resins suitable for the invention compositions have molecular weights generally within the range of 86 to about 10,000, preferably about 200 to about 1500. The commercially-available epoxy resin EPON® Resin 828, a reaction product of epiclorohydrin and 2,2-bis(4-hydroxyphenylpropane (bisphenol-A) having a molecular weight of about 400, an epoxide equivalent (ASTM D-1652) of about 185-192, and an n value (from formula I above) of about 0.2, is presently the preferred epoxy resin because of its low viscosity and commercial availability.

The invention composition includes a reactive monomer selected from unsaturated aromatic monomers, esters or amides of ethylenically unsaturated carboxylic acids, cyano-containing compounds, vinyl esters, N-vinyl amides and allyl-containing compounds. Examples of unsaturated aromatic monomers include vinyl aromatic monomers such as styrene, alpha-methyl styrene, and p-methyl styrene; halo- and nitro-substituted styrenes such as vinyl toluene, chlorostyrene, bromostyrene, and nitrostyrene; divinylbenzene; t-butylstyrene; 2-vinylpyridine; and vinylnaphthalene. Styrene and mixtures of styrene and divinylbenzene are preferred.

Suitable unsaturated monocarboxylic acid esters include the alkyl esters of ethylenically unsaturated acids such as acrylic acid, methacrylic acid, crotonic acid, alpha-phenylacrylic acid, alpha-cyclohexylacrylic acid, maleic acid, cyanoacrylic acid, methoxyacrylic acid, and the like. Very preferred acids are acrylic acid and methacrylic acid. Accordingly, suitable such esters include methyl methacrylate, ethyl acrylate, butyl acrylate, butyl methacrylate, isobutyl methacrylate, and the like wherein side chains may contain halogen, e.g., 2,3-dibromopropyl acrylate and pentachlorophenyl methacrylate.

Very preferred comonomers include the polyacrylate and polymethacrylate esters of polyols containing more than one terminal acrylate or methacrylate group. These esters are the acrylic and methacrylic acid esters of aliphatic polyhydric alcohols such as, for example, the di- and polyacrylates and the di- and polymethacrylates of alkylene glycols, polyoxyalkylene glycols, alicyclic glycols and higher polyols, such as ethylene glycol, triethylene glycol, tetraethylene glycol, tetramethylene glycol, hexanediol, trimethylolethane, trimethylolpropane, pentaerythritol, dipentaerythritol, tripentaerythritol and the like, or mixtures of these with each other or with their partially esterified analogs.

Typical compounds include but are not limited to trimethylolpropane triacrylate, trimethylolethane triacrylate, trimethylolpropane trimethacrylate, trimethylolethane trimethacrylate, tetramethylene glycol dimethacrylate, ethylene glycol dimethacrylate, triethylene glycol dimethacrylate, pentaerythritol triacrylate, pentaerythritol tetraacrylate, 1,6-hexanediol diacrylate, 1,6-hexanediol dimethacrylate, dipentaerythritol tetraacrylate, dipentaerythritol pentaacrylate, and the like. Particularly preferred esters are neopentyl glycol dimethacrylate, trimethylolpropane trimethacrylate, trimethylolpropane triacrylate, pentaerythritol triacrylate, and 1,3-butylene dimethacrylate.

Suitable unsaturated carboxylic acid amides include acrylamide, N,N'-dimethylacrylamide, diacetone acrylamide, N-isopropylacrylamide, and N,N'-dimethylmethacrylamide, for example.

Suitable cyano-compounds are acrylonitrile, methacrylonitrile and halogenated acrylonitriles, for example.

Suitable vinyl esters include vinyl acetate, vinyl benzoate and divinyl adipate. Suitable N-vinyl amides include N-vinylpyrrolidone, N-vinyl-N-methylacetamide and N,N'-divinyl-N,N'-dimethyladipamide.

Suitable allyl monomers include diallyl phthalate, triallyl isocyanurate, diallyl isophthalate and diethylene glycol bis(allylcarbonate).

The described reactive monomers will be blended with the polyepoxide component of the invention composition in an amount within the range of about 5 to about 75, preferably about 10 to about 50, weight percent, based on the weight of the epoxy resin.

The invention composition preferably contains a free radical initiator for the reactive monomer(s). Examples of such initiators include peroxides, such as benzoyl peroxide, tertiary butyl hydroperoxide, ditertiary butyl peroxide, hydrogen peroxide, potassium peroxydisulfate, bis(methylcyclohexyl)peroxide, cumene hydroperoxide, acetyl benzoyl peroxide, Tetralin hydroperoxide, phenylcyclohexane hydroperoxide, tertiary butyl peroxyacetate, dicumyl peroxide, tertiary butyl peroxybenzoate, and the like, and mixtures thereof; azo compounds such as 2,2'-azobisisobutyronitrile, dimethyl 2,2'-azobisisobutyrate, 2,2'-azobis(2,4-dimethylvaleronitrile), 2,2'-azobisisobutyramide, 2,2'-azobis(2-acetoxypropane), and the like. Particularly preferred initiators include the dialkyl peroxides, tertiary alkyl hydroperoxides, and alkyl esters of peroxycarboxylic acids. Especially useful peroxides include tertiary butyl peroxy(2-ethylhexanoate) and 2,5-bis(tertiary butyl peroxy)-2,5-dimethylhexane. The optimum amount of free-radical initiator can vary over a broad range depending on the amount of the particular unsaturated monomer used and the type of curing agent present. In general, a curing amount for the reactive monomer is employed. One skilled in the art would simply adjust the amounts of a particular initiator to suit existing process conditions.

The invention composition includes a phenolic curing agent for the epoxy resin. The phenolic curing agent will preferably have a functionality greater than about 1.75. The preferred curing agents are phenolic novolacs prepared by reacting a monohydroxy phenol such as phenol or o-cresol, or a dihydroxy phenol such as resorcinol or bisphenol-A with formaldehyde in acid solution. The phenolic novolac curing agent will be present in the composition in an amount effective to cure the epoxy resin, which will generally be a stoichiometric amount of about 0.75 to about 1.25 equivalents per equivalent of epoxy resin. In terms of weight percent, the curing agent will be present in an amount generally from about 10 to about 70 weight percent, preferably about 15 to about 50, most preferably about 15 to about 40, based on the combined weight of epoxy resin and curing agent.

The invention composition includes an isocyanate. Preferred isocyanates can be represented by the formula

$$R-N=C=O]_n$$

in which R is a mono- or multivalent $C_{1-20}$ hydrocarbyl moiety which can be substituted with non-interfering functionalities, such as halide, and may contain heteroatomic bridging moieties such as —S—, —O—, CONH, or CO; for example, and n is equal to the valence of R. Examples of suitable isocyanates include 4,4'-diisocyanatodiphenylmethane, toluene diisocyanate, hexamethylene diisocyanate, $\alpha,\alpha,\alpha',\alpha'$-tetramethyl-$\alpha,\alpha'$-xylylene diisocyanate, and the oligomeric isocyanates prepared by treating anilineformaldehyde oligomers with an excess of phosgene.

The amount of isocyanate compound present will vary depending on the properties desired in the final product, but the composition will generally contain from about 15 to about 150, preferably about 30 to about 60, weight percent isocyanate compound, based on the weight of the epoxy resin.

EXAMPLE 1

A series of experiments was performed to evaluate the properties of isocyanate-containing epoxy-based compositions according to the invention. Formulations were prepared by combining a resin component containing a liquid diglycidyl ether of bisphenol-A (WPE about 185-192), trimethylolpropane trimethacrylate reactive monomer (TMPTMA), and isocyanate (Isonate 143L, a 4,4'-diisocyanatodiphenylmethane modified with carbodiimide linkages to make it liquid at room temperature); with a curing agent component containing CRJ-406 o-cresol novolac from Schenectady Chemicals, styrene, Lupersol 101 peroxide, Fikure 62-U (phenyldimethyl urea) and, in some cases, dibutyltin diacetate or dibutyltin dilaurate catalyst. The formulations and tested properties are shown in Table 1.

EXAMPLE 2

Formulations were prepared as in Example 1, except that an isocyanate based on an aniline-formaldehyde oligomer containing an average of 3.1 isocyanate groups per molecule (PAPI 135 from Dow) was used, and the epoxy resin was a diglycidyl ether of BPA having a WPE of about 178–186. Formulations and results are shown in Runs 12, 13 and 14 of Table 1.

EXAMPLE 3

The resin component and curing agent component were reformulated to determine if shelf life of the formulations could be improved. The resin component for Runs 15, 16 and 17 contained a liquid diglycidyl ether of bisphenol-A (WPE 178–186) epoxy resin, o-cresol novolac (CRJ-406), styrene, divinylbenzene or TMPTMA and (in Runs 15 and 16) 0.03 phr hydroquinone. The curing agent component contained isocyanate, Lupersol 101 and the urea compound. Results are shown in Runs 15, 16 and 17 of Table 1.

TABLE 1

| | | | ISOCYANATE-THICKENED PHENOLIC-CURED RESINS[a, b] | | | | | | |
|---|---|---|---|---|---|---|---|---|---|
| Run | Epoxy Resin | TMPTMA, Parts | Isocyanate, Parts | CRJ 406, Parts | Styrene Parts | Lupersol 101 Parts | Fikure 62-U Parts | Tin Catalyst Parts | Time (hours)- Brookfield vis. (mPa · s), ~25° C. |
| 1 | 100 | 40 | 60[h] | 73 | 40 | 0.5 | 0.88 | | 0-1900, 2-2100, 4-2520 |
| 2 | 100 | 40 | 60[h] | 73 | 40 | 0.5 | 0.88 | 0.27[d] | Cured immediately to rubbery gel |
| 3 | 100 | 40 | 30[h] | 73 | 40 | 0.48 | 0.88 | | 0-2480, 2-3000, 4-4200, 6-4800 |
| 4 | 100 | 40 | 30[h] | 73 | 40 | 0.48 | 0.85 | 0.27[d] | Cured immediately to tacky gel |
| 5 | 100 | 40 | | 73 | 40 | 0.48 | 0.89 | | 0-2050, 2-2500 4-3200, 6-4000 |
| 6 | 100 | 40 | 30[h] | 73 | 40 | 0.48 | 0.88 | | |
| 7 | 100 | 40 | 30[h] | 73 | 40 | 0.48 | 0.88 | 0.057[e] | Cured immediately to soft tacky gel |
| 8 | 100 | 40 | 90[h] | 73 | 40 | 0.48 | 0.83 | | |
| 9 | 100 | 40 | 90[h] | 73 | 40 | 0.48 | 0.83 | 0.069[e] | Cured immediately to soft gel |
| 10 | 100 | 40 | 120[h] | 73 | 40 | 0.48 | 0.90 | | |
| 11 | 100 | 40 | 120[h] | 73 | 40 | 0.48 | 0.90 | 0.075[e] | Cured immediately to soft gel |
| 12 | 100 | 40 | 40[i] | 75 | 50 | 0.49 | 0.92 | 0.009[e] | 0-875 |
| 13 | 100 | 40 | 30[i] | 75 | 50 | 0.50 | 0.92 | 0.009[e] | 0-888 |
| 14 | 100 | 40 | 20[i] | 75 | 50 | 0.49 | 0.92 | 0.009[e] | 0-850 |
| 15 | 100 | 41[c] | 60[i] | 75 | 27 | 0.49 | 1.0 | | 0-723, 1.23-868, 3.23-1465 |
| 16 | 100 | 41[c] | 30[i] | 75 | 27 | 0.25 | 0.5 | | 0-804, 1.16-850, 3.13-1095 |
| 17 | 100[g] | 40 | 60[h] | 73 | 40 | 0.5 | 0.88 | | |

| Run | Gel Time, 150° C. Sec. | HDT 264 psi °C. | Comments |
|---|---|---|---|
| 1 | | 159, 168 | Hard gel after 1 month |
| 2 | | | Hard gel after 1 month |
| 3 | | 134, 132 | Soft tacky gel after 2½ months-"melts" at 150° C. |
| 4 | | | Soft tacky gel after 2½ months-"melts" at 150° C. Non-melting after 11 months |
| 5 | | 118, 114 | Liquid after 11 months |
| 6 | >10 min. | (f) | Soft tacky gel after 9 months-melts @ 150° C. |
| 7 | | | Non-melting after 9 months |
| 8 | >10 min. | (f) | Hard, non-melting after 1 month |
| 9 | | | Hard solid after 1 week |
| 10 | >10 min. | (f) | Hard (but melting) gel after 1 month |
| 11 | | | Hard solid after 1 week |
| 12 | | (f) | Stiff gel after 1 week, not melting at 175° C. |
| 13 | | (f) | Stiff gel after 1 week, not melting at 175° C. |
| 14 | | (f) | Soft gel after 1 week, melting at 175° C. and regelling in 100 seconds |
| 15 | 29 | (f) | |
| 16 | 50 | (f) | |

| | 17 | >450 | 168, 169 | Tg (Rheometrics) 198° C. |

[a] Cure cycle: 1 hour @ 120° C. followed by 2 hours @ 170° C.
[b] All components mixed together before aging.
[c] Divinylbenzene used instead of TMPTMA.
[d] Dibutyltin diacetate.
[e] Dibutyltin dilaurate.
[f] HDT bars were filled with voids.
[g] Cure cycle: 1 hour @ 100° C. followed by 2 hours @ 150–180° C.
[h] Isonate 143L.
[i] PAPI 135.

I claim:
1. A composition comprising:
(a) a curable epoxy resin;
(b) an effective amount of a phenolic novolac curing agent having a functionality greater than about 1.75;
(c) from about 15 to about 150 weight percent, based on the weight of the epoxy resin, of an isocyanate compound which can be represented by the formula

R—N=C=O]n in which R is a multivalent substituted or unsubstituted $C_{1-20}$ hydrocarbyl moiety and n is an integer equal to the valence of R;
(d) from about 5 to about 75 weight percent, based on the weight of the epoxy resin, of a reactive diluent selected from the group consisting of unsaturated aromatic monomers, esters or amides of ethylenically unsaturated carboxylic acids, unsaturated cyano-containing compounds, vinyl esters, N-vinyl amides and allyl-containing compounds; and
(e) an effective amount of a free radical polymerization initiator for the reactive diluent.

2. The composition of claim 1 in which the isocyanate compound is selected from the group consisting of 4,4'-diisocyanatodiphenylmethane, toluene diisocyanate, hexamethylene diisocyanate, $\alpha,\alpha,\alpha',\alpha'$-tetramethyl-$\alpha,\alpha'$-xylylene diisocyanate, and oligomeric isocyanates prepared by treating aniline-formaldehyde oligomers with an excess of phosgene.

3. The composition of claim 2 in which the reactive diluent is selected from the group consisting of styrene, trimethylolpropane trimethacrylate and mixtures of these.

4. The composition of claim 3 in which the epoxy resin is a diglycidyl ether of bisphenol-A.

5. The composition of claim 3 in which the free radical polymerization initiator is a peroxide compound.

6. The composition of claim 2 in which the isocyanate compound is present in the composition in an amount within the range of about 20 to about 60 weight percent, based on the weight of the epoxy resin.

7. The composition of claim 1 in which the isocyanate compound is a carbodiimide-modified diisocyanatodiphenylmethane.

* * * * *